3,618,314
METHOD AND MEANS TO CONTROL AIR POLLUTION FROM MOTOR VEHICLES AND MOTOR VEHICLE ENGINES
LeRoy J. Krebs, 2928 N. Milwaukee Ave., Chicago, Ill. 60618
Filed Apr. 9, 1970, Ser. No. 26,856
Int. Cl. F01n 3/04, 3/14
U.S. Cl. 60—30 L    6 Claims

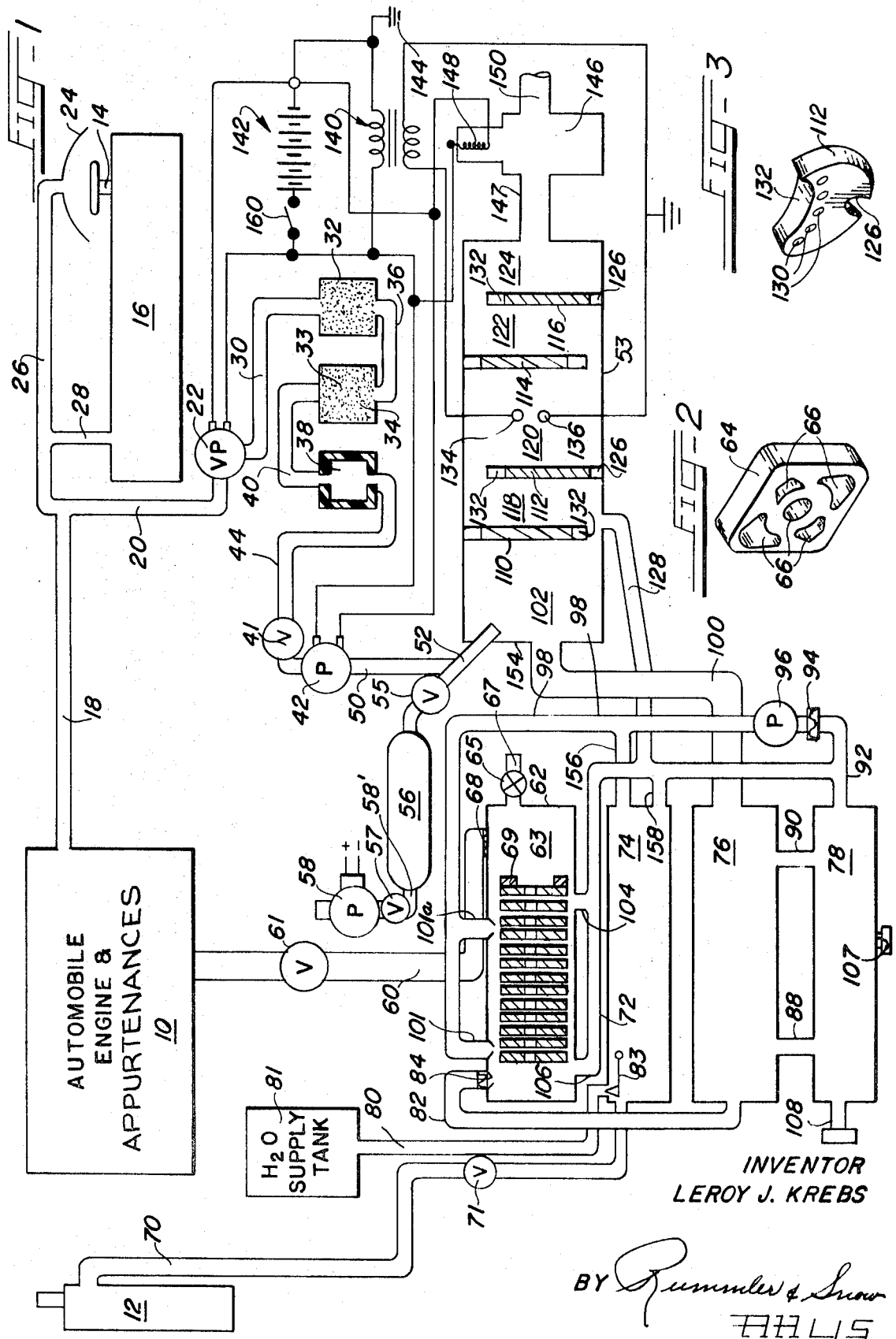

ABSTRACT OF THE DISCLOSURE

An antipollutant device associated with a motor vehicle to control the vehicle emissions to atmosphere, not only the emissions from the exhaust port of the motor but also fuel and oil evaporative emissions. The evaporative emissions are collected in a collector unit and the motor exhaust port emissions filtered and treated, and particulate matter collected and gases burned.

BRIEF SUMMARY OF THE INVENTION

The main object of this invention is to provide a system and means for removing pollutants from vehicle motor emissions and fuel and oil evaporative emissions when the vehicle motor is operating; to provide a collector for the evaporative emission to substantially reduce the same to a gas; to provide, in addition to the aforesaid collector, a system and unit to collect particuate matter and gases in a tube or tank having a series of chemical blocks therein which have an affinity for carbon and to which the carbon adheres; to provide a device of this character wherein an admixture of water and glycerine is continuously sprayed over the aforesaid blocks to help keep them clean, which admixture and particulates are partially drained off and placed in a settling tank and the water and glycerine returned to spray again; to provide a device of this character wherein water overflow and steam from the radiator of the vehicle is collected and fed into a first tube or tank of water; a series of additional tubes or tanks stacked in a vertical plane below said water tank and all tanks, each lying in a horizontal plane one above the other; to provide a device of the class described wherein the exhaust gases from a motor vehicle engine exhaust port pass through an elongated tube or tank containing a series of perforated blocks made up from a material which has an affinity for carbon particles which adhere thereto and said tube has water sprayed on the blocks to partially remove the excess particulates, the excess water admixture draining off out of said tube and moved to a settling tank and the water returning to the spray again with an additional amount of water added; to provide in such a device a second elongated tank or tube from which said first tank or tube drains and which tube contains an admixture of water and glycerine, said second tube connected to an afterburner wherein the gases and an admixture of water and glycerine and any particulate matter are separated out, the gases burned away by a high voltage spark gap and the remaining fluids drained back therefrom to a water tank or tube; a device of this character wherein an afterburner is employed to burn off the gases so that substantially no pollutant emission is fed in the atmosphere and which afterburner is provided with a series of spaced baffles which have an affinity to attract and hold carbon particles; and a magnetic fly trap between the emission from the afterburner and the atmosphere; and to provide in a device of the class described an air tank and a conduit directing air under pressure into the afterburner to assist in moving the admixture entering therein through the afterburner.

BRIEF DESCRIPTION OF THE DRAWINGS

FIG. 1 is a diagrammatic layout drawing of my antismog system as applied to an automobile or truck.
FIG. 2 is a perspective view of one of my catalyst blocks.
FIG. 3 is a perspective view of a baffle I employ in the afterburner.

DETAILED DESCRIPTION OF THE INVENTION

All vehicles which use liquids for operation exhaust harmful particulate, gases, carbon, soot and other wastes, to pollute the atmosphere.

The present invention is directed to a means for control of crankcase ventilation and carburetor evaporation losses from gasoline-powered passenger cars, trucks and buses; and from diesel-powered vehicles, control of tailpipe emissions such as smoke (solid or liquid particulates), odors, hydrocarbons, and nitrogen oxides.

The pollutants from tailpipe emissions from gasoline-powered vehicles include hydrocarbons, nitrogen oxides, carbon monoxide, particulate material such as lead or other toxic mineral compounds derived from fuel additives, organic oxygenated substances such as aldehydes, and polynuclear compounds.

In FIG. 1 of the drawing, I have diagrammatically represented an engine of a vehicle by the numeral 10 which is intended to include all appurtenances associated therewith which reasonably might be expected to influence the vehicle's pollutant potential, including but not restricted to the generator, water pump, oil pump, air brake compressor, power accessory units, air conditioner, fuel system (including carburetor or fuel injector), oil filter, oil filling conduit, air filter, crankcase, and all systems and devices employed to limit pollutants and/or fuel evaporative emissions from the vehicle, with the exception of the radiator 12 and the fuel tank 16. Also included among the appurtenances would be a fuel pump, the fuel lines, the carburetor or fuel injector and all fuel system vents and fuel evaporative emission control systems or devices.

Where a direct venting connection cannot be made to the above appurtenances, then it is within the spirit of this invention to include hoods mounted above such appurtenances to allow the drawing off of fumes or other emissions whereby they may be drawn into the collector system which will hereinafter be described.

Such vapors and emissions are designed to be drawn off through a conduit 18 to a conduit 20 under the influence of a vacuum pmp 22.

Also, a flexible hood 24 is provided above the filter neck 14 of the gas tank 16 through a conduit 26 which leads to conduit 20. A conduit 28 is positioned in the upper end of the fuel tank 16 and at its other end is connected to the conduit 26 whereby all vapors and emissions are drawn under the influence of the vacuum pump 22 to conduit 30. All these emissions and vapors are drawn to a common collector source, namely by the vacuum pump 22 which exhausts to conduit 30 and into and through a tube or chamber 32 containing activated charcoal to filter out as much particulate matter as possible. The chamber 32 is connected to a second chamber 34 through conduit 36. The chamber 34 is preferably filled with a product 33 identified by the trademark "Molecuar Sieve" Type 13x, which is produced by the Union Carbide Company, and such chemical formula is $$Na_{86}[(AlO_2)_{86}(SiO_2)_{106}]xH_2O$$

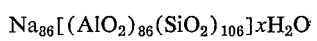

This product is in the form of powdered pellets and is covered by U.S. Pats. 2,882,244 and 2,973,327. This product has a good attraction for carbon particles and thus was chosen for use in this invention.

The vapors and gaseous products will then flow to a clear plastic or glass cell 38 through conduit 40. This cell 38 may be visually inspected to check the flow rate.

Thus all the vapors will be substantially free from particulate matter by the time they are filtered out of the collector source.

A second vacuum pump 42 withdraws the filtered vapors from the cell 38 through conduit 44, through the surge valve 41, then exhausts it through conduit 50 to a diagonal conduit 52 which exhausts into the afterburner tube 53. The conduit 52 is also connected to a compressed air tank 56, which tank contains air under approximately 120 p.s.i., which is provided by pump 58. Check valves 55 and 57 are also positioned in conduits 52 and 58', respectively.

Exhaust gases, etc., from the motor are drawn off through exhaust pipe conduit 60 to the forward end of the tank or tube 62. A flap valve 61 is provided in conduit 60 to prevent any back pressures reaching the engine block. If a back pressure is created in the system of this application, the flap valve will close. The tank 62 contains a molded product consisting of the material herebefore identified as "Molecular Sieve" in a binder such as soda, lime, calcium or the like, to form a block 64 such as shown in FIG. 2. The block 64 is provided with a series of apertures 66. As shown in FIG. 2, the blocks 64 are generally of square shape but the corners are rounded whereby the block can readily fit within tube 62 and leave spaces between the edges of the blocks and the interior wall of tube 62. Thus, if the interior of the tube has a diameter of six inches, a four by four block 64 with rounded corners could be set into the interior of the tube 62. Thus, in addition to the apertures 66, there would be ample clearance for gases to pass around the edges of the block. A plurality of blocks are placed in the tank 62 and loosely packed therein. The exhaust end of conduit 60 is also provided with a fine removable screen 68 to help remove some of the particulate matter.

The water overflow and steam from the radiator 12 passes through conduit 70 to a tank or tube 74 with a check valve 71 therein. The check valve prevents back flow to the radiator.

There are three tanks or tubes 74, 76 and 78, all preferably in stacked alignment with the tank or tube 62, and each in a horizontal plane. The tube 74 is filled with water through conduit 80 having a supply tank 81 and a float valve 83 to maintain a full tank of water. The tube 76 is filled with water and an admixture of just enough glycerine to make the solution tacky. The tube 78, being at the bottom of the stack, will contain water and water and glycerine admixture and a great deal of the filtered out particulate matter such as mud-like or slushy matter which will settle in the bottom of tube 78, as will hereinafter be described.

Since the gases from the exhaust enter the right hand or rear portion of tube 62 under pressure, some of these gases will flow through the apertures 66 and around the blocks 64 to the outlet conduit 82 which is provided with a fine screen 84 to help filter out the particulate matter that does not cling to the surfaces of blocks 64. The conduit 82 is connected to tube 76. The tube 76 also partially drains into a tube 78 through conduits 88 and 90. The liquid admixture in tube 78 is directed through conduit 92 through a fiberglass filter 94 to the water pump 96. The pump 96 forces the liquid through conduit 98 to its outlet conduits 100 and 101. The outlets of conduits 101 and 101a terminate in venturi openings to spray the admixture to tube 62 over the blocks 64 to wash off as much particulate matter as possible which will settle in the bottom of tube 62 and pass through drain conduits 104–106 which are connected to the conduit 72 which terminates in conduit 92. The particulate matter, being coated with glycerine, will settle in the bottom of tube 78. Tube 78 is provided with a drain pipe or conduit 107 and has a connector conduit 108 for attachment to a water hose for flushing the tube 78 when it is to be cleaned out of matter settled therein. The cleaning, of course, is done when the automobile is not in operation.

The exhaust gases passing out of tank 62 flow through conduit 82 to tube 76 and part of the contents of tube 76 will flow out through conduit 100 to the chamber 102 of the afterburner 53. The foregoing action will take place because of the pressure of the exhaust gases.

The tube 53 has a series of four spaced, anchored, semi-cylindrical blocks 110, 112, 114 and 116, forming five individual chambers 102, 118, 120, 122 and 124. The forms of blocks 110–116, inclusive, are generally shown in FIG. 3 and they are constructed of the same "Molecular Sieve" material as the blocks 64.

The blocks 110–116, inclusive, are each provided with an opening 126, so that the lower end of the blocks 112 and 116 adjacent the bottom inner wall of tube 53 will be provided with drain holes through the respective blocks. All the blocks 110–116 are individually anchored to the inner wall surface of tube 53 by any suitable means, but preferably in the position shown in the drawing.

Each block 110–116, inclusive, is provided with a series of apertures 130 and is provided with a concave portion 132 whereby, when properly spaced and anchored in tube 53, they will act as baffles and have their surfaces exposed to pick up any carbon particles impinging thereagainst.

The tube 53 is also provided with a drain 128 which is connected adjacent the bottom of tank 53, which drain communicates with conduit 98 and tank 74.

A pair of electrodes 134, 136 are positioned medially between blocks 112 and 114 in chamber 120. As illustrated, the electrodes are connected to the two sides, respectively, of the secondary of the transformer 140. The primary side is connected on one side to the positive side of an energy source, such as a D.C. battery 142, and the other side to the negative side, and grounded at 144. The high tension transformer should have a potential of creating a voltage of about 10,000 volts so that the electrodes 134–136 will provide a good sized spark gap to burn up any exhaust gases fed into tube 53.

The rear end of the tube 53 is provided with a conduit 147 leading to a magnetic trap 146 containing an electro magnet 148 electrically connected to the battery in the usual way, to trap any remaining fly ash before exhausting to atmosphere through the exhaust conduit 150.

The pumps 22, 42, 58, 96 and surge valve 41 are all electrically connected to the battery 142 for operation when the engine is operating to prevent drain on the battery. The positive side of the energy line is connected through the ignition switch 160.

The stacked tanks or tubes 62, 74, 76 and 78 are preferably cylindrical in shape and each preferably has a length of about 36" and a diameter of 6", 6", 8" and 6", respectively. The conduits 82 and 100 each preferably have a diameter of 4". All the rest of the conduits may be preferably ⅜" in diameter. The afterburner tube is preferably a cylindrical tube constructed of heavy gauge metal having a length of about 3 feet and a diameter of 8 inches. The spacing of the blocks in the tube 53 is important to prevent back pressure. Thus the area of chamber 102 is larger than the area of chamber 118. Chamber 124 has the same area as chambers 118 and 122. Chamber 120, however, is the largest chamber because of the spark and burning of any burnable gases remaining in the system passing therethrough. Thus the chamber 122 is the cooling chamber and chamber 124 is the condensing chamber whereby any liquid condensed would collect in the bottom of tube 53 and be returned to tube 74 through conduit 128.

The chamber 102 receives the vapors collected by the collector consisting of chambers 32, 34 and 38, via conduits 44–50 and 52. Air under 80 p.s.i. also flows into chamber 102 from tank 56. The valve 55 in conduit 52 controls the amount of air flowing from tank 56 to the chamber 102 and simultaneously will cut off all air flow if a back pressure happens to be created in tube 53. Also, the safety valve 57 controls the amount of pressure desired in tank 56.

Since an admixture of water and glycerine and exhaust gases will be flowing into chamber 102 through conduit 100 under the pressure created by the exhausting of gases, carbon and particulate matter flowing from the engine 10 through conduit 60, the movement of the whole admixture in chamber 102 will flow tortuously through tube 53. The outlet end of conduit 100, being anchored medially in the end wall 154, directs the admixture against block 110 which will pick up some of the carbon particles remaining therein. The water and glycerine mixture, being heavier than the gases, will flow to the bottom of the tube 53 with the help of the air under pressure emitted in chamber 102 from conduit 52. The admixture in the bottom of tube 52 will flow to conduit 72, to conduit 92, where the sediment will flow into tube 78 and settle in the bottom while the entrained air and water admixture will be returned to tube 62 by pump 96. Now the gases, and whatever water and glycerine which are carried through the cutout opening 132 and the openings therebelow, will impinge against block 112, where it will pick up any additional carbon particles. The remainder will flow upwardly out of chamber 118 and through the cutout 132 in block 112 and enter the burner station of chamber 120 substantially in the form of vapor or gas. Also, any water and glycerine admixture entering chamber 118 will be drawn off through conduit 128.

As the spark in chamber 120 is so intense, it should burn off all burnable gases remaining from the engine exhaust and any fly ash will be gathered in by the collector as aforesaid.

Should any carbon or particulate matter flow into chamber 122 through the opening below cutout 132 in block 114, it should adhere to the block 116 so that only fly ash should enter chamber 126. Any liquid remaining and passing into chamber 122 will flow to the bottom of the chamber and return to conduit 92 through conduit 128.

Returning to the exhaust gases and particulate matter emanating from the engine 10 which flow through conduit 60, a flap valve 61 is inserted in conduit 60 whereby if any back pressure is created in the system, the valve will close to prevent anything from entering the engine block until the back pressure is relieved.

The exhaust gases and particulate matter will enter the right hand end of the tube 62 and into a chamber 63 through the screen 68. It is noted that a valve 65 is positioned in a small open ended conduit 67 on the right hand end of chamber 63 and communicates therewith. The valve is set to open in the event a back pressure is created in tube 62 whereby the gases are exhausted to atmosphere and close when relieved.

Since the blocks 64 are loosely contained in the tube 62, the gases and particulate matter will impinge thereupon and carbon particles will adhere thereto because of the affinity of "Molecular Sieve" therefor.

It is noted that the blocks 64 are prevented from entering chamber 63 by the inwardly extending bosses 69 secured to the wall of the tank 62. All of the gases and that particulate matter not collected by the blocks 64 will flow out of tube 62 through the fine screen 84 into conduit 82. Simultaneously the water and glycerine admixture will be pumped from the settlement tank 78 through conduit 92 and conduits 98 and 101 and 101a, each of which is provided with a venturi at its outlet end, and will spray the admixture in tube 62. Since the mixture of water and glycerine is tacky in nature, it will have a tendency to wash off the particulate matter and collect it in the bottom of tank 62 and pass through conduits 104 and 106 in the bottom of tube 62. The heavier material will flow therethrough into conduit 72 and into conduit 92 where, the particulate matter being heavier than the admixture of water and glycerine, it will have a tendency to flow back into tank 78, which tank is a sediment tank. Any particulate matter that does not flow back will, of course, be brought to the screen 94 in conduit 92 where particulate matter is gathered and the water and glycerine admixture will be pumped upwardly through conduit 98 back to the catalytic tube 62 where the process begins all over again. Both gases and particulate matter, being under engine pressure and flowing through the exhause pipe of conduit 60, will flow out of tank 62 through conduit 82 and back to the tube 76 in the stack where the gases will move outwardly through conduit 100 to chamber 102 in the afterburner. It is also noted that any carbon and particulate matter remaining will settle to the bottom of tank 76 and flow through conduits 88 and 90 and settle to the bottom of tank 78. The tube 74 is kept filled with water and any steam or water that overflows from the radiator through conduit 70. The tube 74 has a pair of conduits 156 and 158 whereby this water will be directed to conduit 98 through conduit 156 and to conduit 72 through conduit 158 to keep the fluidity of the admixture flowing through the conduits. The tube 78 is provided with a flushout conduit 108, which is capped. When the cap is removed, a water hose can be connected thereto and water flushed through the tube 78 and after the drain 107 has been opened, the slush or mud accumulating in the lower end of tank 78 will be drained off. This, of course, is done when the motor is shut off. The pump 96 is operated to force the water and admixture from tube 78 and the water flowing through conduit 156 into tube 98, at a pressure of about from 3 to 5 p.s.i.

It is also to be understood that the transformer 140 will have to be built up to supply the current required. Thus any device such as a vibrator pack or an ignition coil or the like might be used, as would be obvious.

Further, it is to be understood that the pumps are shown as motor operated from the vehicle battery but they could be operated by the fan belt pulley system.

It should also be obvious that all of the conduits of the system shown in the drawings should be removably attached to the tanks or tubes, chambers, collectors, pumps, etc., for systematically cleaning by flushing with water. Also, all filters must be regularly cleaned, as well as the blocks 64 and 110 to 116.

Although but one embodiment of the foregoing invention has been shown and described, it is to be understood that details may be altered or omitted without departing from the spirit of this invention as defined by the claims.

I claim:

1. An antipollution device for collecting and trapping the carbon and particulate matter emanating from the exhaust system of an internal combustion engine comprising a series of horizontally positioned tanks stacked in vertical alignment, a first tank having an inlet at one end thereof connected to said exhaust system and provided with a series of loosely packed perforated blocks through which said exhaust gases must pass, each of said blocks built up from a chemical substance having an affinity for carbon particles and to which the carbon particles will adhere, an outlet at the end opposite the inlet end of said first tank, and a second tank having communication with said first tank and containing an admixture of water and glycerine which is force fed in jet streams over said blocks.

2. The device according to claim 1 wherein a third tank containing glycerine and water has communication with the first tank to receive the gases and any carbon and particulate matter exhausting from said first tank, and an afterburner for burning off the gases remaining, said third tank having direct communication with said afterburner.

3. The device according to claim 2 wherein said third tank has communication with said second tank to supply a glycerine and water admixture thereto, and a fourth tank containing water to supply additional water to the first and second tanks.

4. The device according to claim 3 wherein the afterburner is an elongated cylindrical tank having a reduced inlet at one end of the tank and a reduced outlet at the other end; a series of spaced baffles in said tank forming an undulating passage for gases from the inlet to the outlet of the afterburner, said baffles constructed of a chemical substance having an affinity for carbon particles; an extensive spark chamber located medially of the ends of said afterburner tank; and a fly ash trap positioned outside of and adjacent the outlet end of said afterburner tank.

5. An antipollution device for internal combustion engines, a series of vertically stacked tanks, a filter tank, a series of loosely packed chemical blocks having an affinity for carbon particles, in said filter tank, said tank having an inlet and an outlet, the exhaust from said engine connected to said inlet end of said tank; a second tank containing water, a conduit connected between the outlet end of said first tank and to said second tank; an afterburner; a conduit connecting said second tank with said afterburner; a third tank containing water; a fourth settlement tank, a conduit connecting said third tank and said settlement tank with said filter tank; means in said last mentioned conduit to force liquid from said third tank and said settlement tank to said filter tank and jet spray said liquid over said blocks; a conduit connected to the bottom of said filter tank and to the settlement tank; a series of spaced baffles in said afterburner forming an undulating path for the gases passing out of said second tank and into said afterburner; means to return the liquid to said second tank and to the conduit between the settlement tank and said filter tank, a pair of electrodes in said afterburner to burn off gases passing therebetween, means to collect fly ash emanating from said afterburner, and means for injecting air under pressure in the inlet end of the afterburner.

6. The method for controlling pollution from internal combustion engines comprising filtering the exhaust gases and particulates, then passing the remainder to a water solution, then passing the admixture to an afterburner in the presence of air under pressure, separating out the liquids and burning the gases in a spark gap, collecting the vapors emanating from the engine and its appurtenances and filtering the same and passing them to the afterburner under pressure, and subjecting the filtered out particulate matter to a jet spray to wash off the filter and directing said washed off matter to a settling tank.

References Cited

UNITED STATES PATENTS

| | | | |
|---|---|---|---|
| 1,756,897 | 4/1930 | Bilsky | 60—30 |
| 2,038,313 | 4/1936 | Placko | 60—30 L |
| 2,057,579 | 10/1936 | Kurth | 55—242 |
| 3,059,420 | 10/1962 | Schnabel | 60—30 |
| 3,067,002 | 12/1962 | Reid | 23—2 E |
| 3,083,524 | 4/1963 | Dosie | 60—29 |
| 3,407,045 | 10/1968 | Temple | 55—242 |
| 3,476,524 | 11/1969 | Burke | 60—30 L |

DOUGLAS HART, Primary Examiner

U.S. Cl. X.R.

23—2 E, 277 C; 55—242, 389, 485